May 4, 1937.    W. H. COLLIER    2,079,314
SPRING SUSPENSION FOR AUTO VEHICLES
Filed April 14, 1936    2 Sheets-Sheet 1
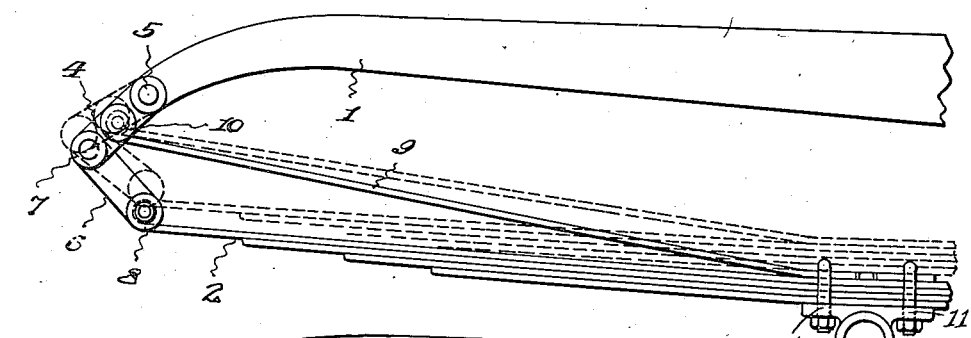
Fig. 1
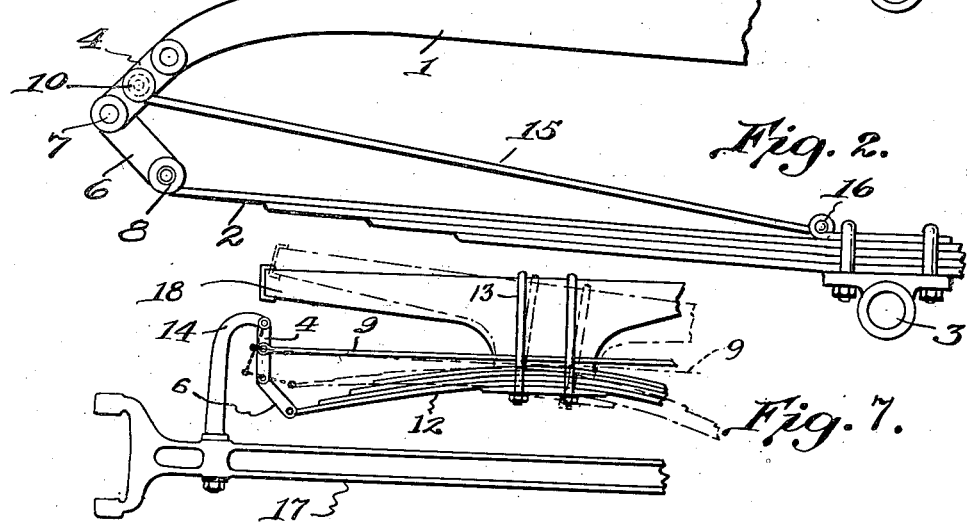
Fig. 2.
Fig. 7.
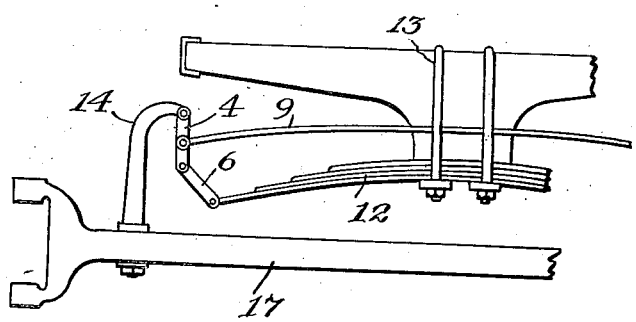
Fig. 3.
INVENTOR:
William H. Collier.
BY Eugene C. Brown
ATTORNEY May 4, 1937. W. H. COLLIER 2,079,314
SPRING SUSPENSION FOR AUTO VEHICLES
Filed April 14, 1936 2 Sheets-Sheet 2
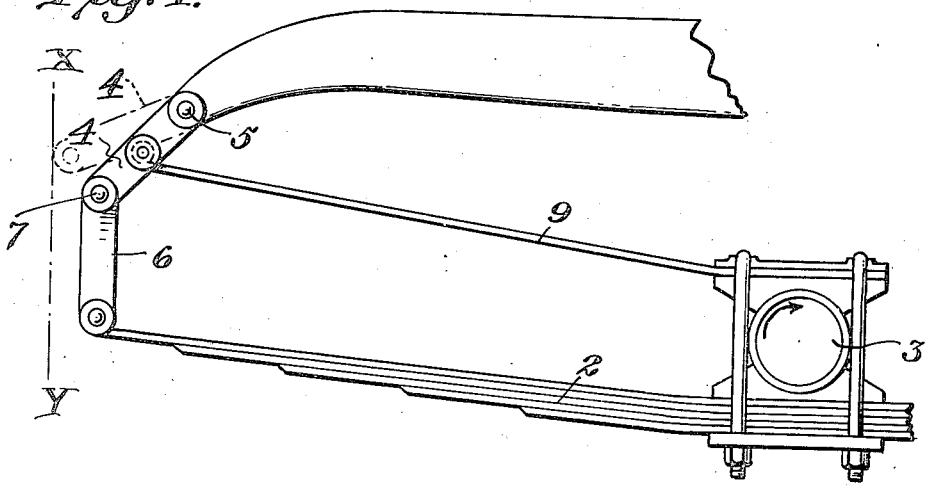
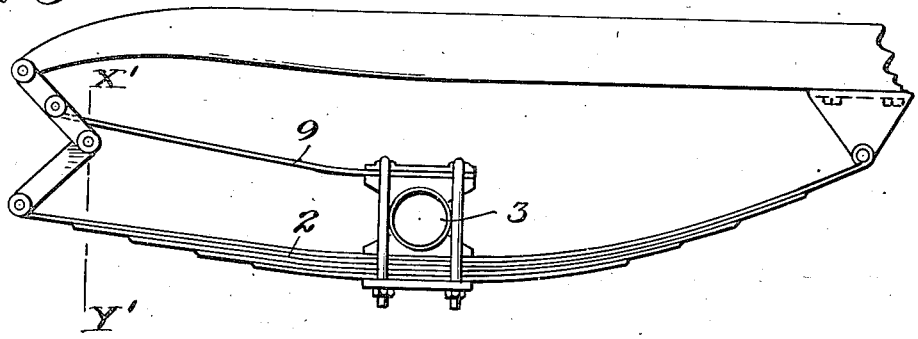
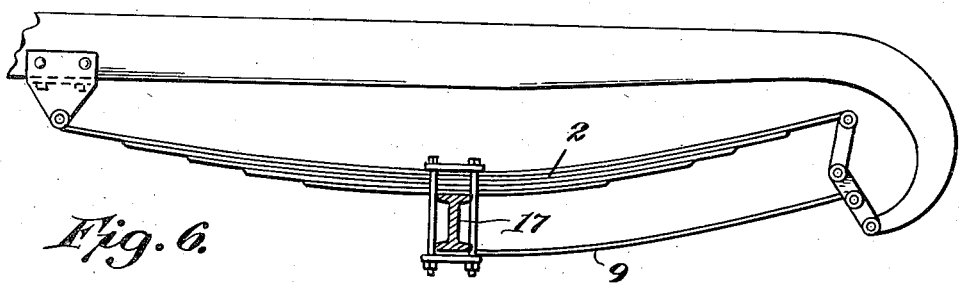
Inventor
William H. Collier
Eugene C. Brown
Attorney Patented May 4, 1937

2,079,314

UNITED STATES PATENT OFFICE 2,079,314

SPRING SUSPENSION FOR AUTO VEHICLES

William H. Collier, Jackson, Tenn.

Application April 14, 1936, Serial No. 74,352

8 Claims. (Cl. 267—19)

This invention relates to spring suspensions particularly designed for auto vehicles both of the longitudinal and transversely sprung type.

The invention has for its general object the provision of means in combination with the usual leaf spring and the customary spring shackle, for modifying the freedom of movement of the spring in such a manner as to inhibit braking torque and axle chatter, that it functions as a shock absorber, that it stabilizes the automobile and in effect lengthens the spring varying its rate of amplitude, and promoting easy riding, that it banks the body of the car at curves, prevents side sway, and in all respects improves the riding qualities of the car.

Most specifically stated, the object of the invention is to provide in combination with a leaf spring and a shackle, a thrust member which may be a rigid radius rod or a leaf spring capable of transmitting an endwise thrust, either pivotally mounted or otherwise anchored adjacent the spring support, and thrusting against the spring shackle to deflect the latter in one direction or the other, thereby to cause a correlative operation of the several elements involved, enabling them to perform the beneficial functions aforementioned.

Other objects of the invention will appear as the following description of a preferred and practical embodiment thereof proceeds.

In the drawings which constitute a part of this specification and throughout the several figures of which, the same characters of reference have been employed to designate identical parts:

Figure 1 is a side view of the rear portion of a side frame member of an automobile including a portion of the rear spring and the device of my invention, the same being in the form of a resilient thrust member;

Figure 2 is a similar view in which the thrust member takes the form of a radius rod;

Figure 3 is a front view, part being broken away of an auto vehicle having a transverse spring illustrating the embodiment of my invention;

Figures 4 and 5 are analogous views showing the rear spring of an auto vehicle with the shackle urged in opposite directions;

Figure 6 is a side view illustrating a form of my invention in which the thrust member is underslung; and Figure 7 is a front elevation of a transversely arranged spring illustrating the banking of the body under the operation of my invention.

Referring now in detail to the several figures, and first adverting to Figure 1, the numeral 1 represents a frame member of an auto vehicle suspended by the leaf spring 2 supported on the axle 3 or other wheel support. The spring 2 is indirectly connected in customary manner to the end of the frame member 1 by the conventional shackle 6, including a control link 4, said shackle and link being pivoted together at 7 to form a toggle, the shackle 6 being pivoted to the spring at the point 8 while the control link is pivoted to the frame member 1 at the point 5.

A thrust member 9 is provided which may be either a leaf spring element or a rigid bar. In Figure 1 it is a resilient element, one end of which is secured under the U-bolt 11 which binds the leaf spring 2 together and to the axle. The outer end of the thrust member 9 is pivoted to an intermediate point of the control link 4 at the point 10. It might be pivoted at any other point of the shackle, in fact, it might be pivoted to the portion 6, making that the control link. The thrust member 9 is so positioned as to interfere with or modify the swing of the shackle under the rise and fall and consequent variation in length of the leaf spring 2 incident to its flexions.

During the normal riding position of the spring, the relationship of the control member 9 to the spring and shackles is such that the spring supporting shackle member is moved in the direction of the spring movement and hence does not resist the movements of the spring. When the spring is deflected upward and the pivot point 7 would move outward to the dotted line position shown in Figure 1, the freedom so to move is inhibited by the thrust member 9 which holds the control link 4 in a downward position, thus decreasing the angle of deflection of the spring. Conversely, when the deflection of the leaf spring is downward and the pivotal point 7 would move downward, the thrust member 9 holds the control link outward and thus minimizes the downward deflection of the spring; thus giving a modified rate of amplitude of vibration to the spring. This has the effect of stabilizing the car for when one side of the car receives an impactive blow or drops quickly, the vehicle on that side is caused to move, lifting or lowering the supported end of the spring in the same direction as the axle, thereby decreasing shocks transmitted to the body and thus stabilizing the auto vehicle.

Referring now to Figure 2, the numeral 15 represents a radius rod pivotally mounted at the point 16 adjacent the axle 3. The opposite end of the radius rod is connected to the control link 4 as at 10 in the same manner as is illustrated in Figure 1. The action of this radius rod is precisely the same insofar as its modification of vehicle movement is concerned, the only difference being that in view of its rigidity it is essential to anchor it pivotally rather than rigidly as in Figure 1. Furthermore, a spring thrust member may be considered as auxiliary to and as assisting the resilient action of the spring which of course cannot be said of the radius rod 15.

Figures 4, 5 and 6 show an adaptation of the invention in which the reaction of the spring movements upon the axle play an important part. In Figure 4, the spring 2 is underslung with relation to the axle 3 while the thrust member 9 is mounted above the axle. In addition to the advantages ascribed to the invention in connection with Figures 1 and 2, the arrangement shown in Figures 4 and 5 prevents braking torque or axle chatter. Braking torque would in general be applicable to both front and rear axles while axle chatter would be confined to the rear axle unless the automobile is of the type operating by means of a front wheel drive. Braking torque is the tendency of the axle to rotate in absorbing the rotary movement of the wheels when the brake is applied.

Assuming that the axle 3 in Figure 4 is the rear axle, the braking torque will tend to cause the axle housing to cant or rotate in the direction indicated by the arrow, that is to say, in a clockwise direction as viewed in the figure. The braking torque will cause the rear spring to thrust backwards, swinging the shackle 6 so as to throw the pivotal point 7 upward. This would of necessity swing the control link 4 upward about the pivotal point 5. However, since the control link 4 is tied to the upper side of the axle by means of the thrust member 9, the upward stress of the control link 4 will put the thrust member 9 under tension, rotating the axle in the contrary direction to that indicated by the arrow and thus nullifying the tendency of the axle to rotate at all.

The distinctive difference between Figures 4 and 5 is the direction in which the toggle formed by the shackle 6 and link 4 folds under the influence of the deflection of the spring 2 and the thrust of the thrust member 9. If the relative positions of the shackles and control link as shown in Fig. 4 will be the normal positions of these members for the vehicle, then under slight deflections of the spring caused by small road shocks, the thrust member 9 raises or lowers the end of the spring always on the same side of the vertical direction, absorbing the light shocks and giving a shock absorber action. This is explained by the fact that the point 7 moves outwardly, thus in effect lengthening the spring as far as is indicated by the vertical line $x-y$. A longer spring is more flexible than one of shorter length and therefore is more capable of absorbing light shocks. If a strong shock is encountered however causing such bowing of the spring as results in the toggle reversing itself to the position shown in Figure 5, the spring length in effect is shortened to the point indicated by the vertical broken line $x'-y'$, making the spring action stiffer and adapting it to resist the more powerful shocks.

Axle chatter is the oscillatory vibration of the axle or axle housing which is frequently encountered when the auto vehicle is put through a heavy load as when travelling through snow or deep sand and is caused by the drive pinion riding up on the ring gear. The phenomenon is very much the same as braking torque and the device of the present invention inhibits axle chatter in precisely the same manner as it prevents braking torque, it being essential that the thrust member be mounted on the opposite side of the axle as illustrated in Figures 4 and 5.

Figure 6 illustrates an embodiment of my invention which is shown as being applied to the front axle 17, although it may be as well applied to the rear axle. In this embodiment of the invention, the leaf spring 2 is mounted on top of the axle while the thrust member 9 is mounted below. The mode of operation is similar to that of the forms already described.

In Figure 3, the number 18 represents the front frame member of an automobile which is supported relative to the front axle 17 by means of the transverse leaf spring 12 suspended from the spring perch 14 by a shackle 6 and control link 4. The reference character 9 represents the thrust member which is tied to the spring 12 by means such as the U-bolts 13.

The transverse arrangement of the device of the present invention gives rise to another advantageous function, inasmuch as the weight of the body and frame places the thrust members under compression causing them to thrust out against the shackles in opposing directions, thus preventing body sway.

One of the most advantageous features of the invention in its adaptation to a transverse spring is the banking of the body of the vehicle when the car is turning a curve. This is clearly illustrated in Figure 7 in which the inertia of the body of the car forces the thrust member 9 on the left hand side toward the left, raising the control link 4 and the shackle 6 thus drawing up the left hand end of the spring 12. The effect on the opposite side of the car is just the reverse, the thrust member 9 pulling in on the control link 4, depressing the shackle 6 and lowering the adjacent end of the spring 12, thus banking the car.

It will be understood from the above that I have invented a novel and practical spring suspension which is capable of producing many advantageous results under various conditions of installation and it is to be understood therefore that my invention is not confined to the details of construction or the arrangement of parts as disclosed in the foregoing specification and which are merely exemplary of many other equivalent arrangements and uses and that the scope of my invention is broad and to be ascertained by a fair and liberal construction of the appended claims.

What I claim is:

1. Spring suspension for auto vehicles, comprising a leaf spring, a spring supporting member, a shackle support, shackle members pivoted to said shackle support and to one end of said leaf spring respectively, said shackles being inclined at an angle to each other in normal riding position, and an oscillatable substantially rigid control member secured to said spring supporting member and having an outer end pivoted to one shackle member, the relationship of said control member to said spring and shackles being such that said outer end of the control member freely follows the oscillating movement of the shackles for the normal riding movements of the spring, said control member resisting movement of said shackles and opposing movement of the spring incident to the movement of the spring above and below its normal riding position.

2. Spring suspension for auto vehicles, comprising a leaf spring, a spring supporting member, a shackle support, shackle members pivoted to said shackle support and to one end of said leaf spring respectively, said shackles being inclined at an angle to each other in normal riding position, and an oscillatable control member secured to said spring supporting member and having an outer end pivoted to one shackle member, the relationship of said control member to said spring and shackles being such that said outer end of the control member freely follows the oscillating movement of the shackles for the normal riding movements of the spring, said control member resisting movement of said shackles and opposing movement of the spring at an increasing ratio above and below the normal riding position.

3. Spring suspension for auto vehicles, comprising a leaf spring, a spring supporting member, a shackle support, shackle members pivoted to said shackle support and to one end of said leaf spring respectively, and an oscillatable control member secured to said spring supporting member and having an outer end pivoted to one shackle member, the relationship of said control member to said spring and shackles being such that the spring supporting shackle member is moved in the direction of the spring movement for the normal riding movements of the spring, said control member resisting movement of said shackles and opposing movement of the spring at an increasing ratio above and below the normal riding position.

4. Spring suspension for auto vehicles, comprising a spring supporting member, a leaf spring centrally secured thereto, the portion of the spring on one side of its central support being secured to a rigid support at its outer end, a shackle support, shackle members pivoted to said shackle support and to the outer end of the portion of said spring on the opposite side of said central support, said shackles being inclined at an angle to each other in normal riding position, and oscillatable control member secured to said spring supporting member and having its outer end pivoted to one shackle member, the relationship of said control member to said spring and shackles being such that said control member resists movement of the shackles and opposes movement of the spring incident to the movement of the spring above and below its normal riding position, said first mentioned spring portion and said control member being in tension in opposing directions, thereby resisting any rotation of the axle of the vehicle.

5. Spring suspension for auto vehicles, comprising a leaf spring, a spring supporting member, shackle supports, pairs of shackle members pivoted to said shackle supports and to the opposite ends of said leaf spring respectively, said shackles being inclined at an angle to each other in normal riding position, and an oscillatable substantially rigid control member secured to said spring supporting member and having its opposite ends pivoted to one shackle member of each pair, the relationship of said control member to said spring and shackles being such that said opposite ends of the control member freely follow the oscillating movement of the shackles for the normal riding movements of the spring, said control member resisting movement of said shackles and opposing movement of the spring incident to the movements of the spring above and below its normal riding position and thereby resisting the tendency to lateral sway during sudden turning movements of the vehicle.

6. Spring suspension for auto vehicles, comprising a leaf spring, a spring supporting member, shackle supports, pairs of shackle members pivoted to said shackle supports and to the opposite ends of said leaf spring respectively, and an oscillatable control member secured to said spring supporting member and having its opposite ends pivoted to one shackle member of each pair, the relationship of said control member to said spring and shackles being such that the spring supporting shackle member of each pair is moved in the direction of the spring movement for the normal riding movements of the spring, said control member resisting movement of the shackles and opposing movement of the spring incident to the movement of the spring at an increasing ratio above and below the normal riding position.

7. Spring suspension for auto vehicles, comprising a leaf spring, a spring supporting member, shackle supports, pairs of shackle members pivoted to said shackle supports and to the opposite ends of said leaf spring respectively, said shackles being inclined at an angle to each other in normal riding position, and an oscillatable control member secured to said spring supporting member and having its opposite ends pivoted to one shackle member of each pair, the relationship of said control member to said spring and shackles being such that said opposite ends of the control member freely follow the oscillating movement of the shackles for the normal riding movements of the spring, said control member resisting movement of said shackles and opposing movement of the spring incident to the movement of the spring at an increasing ratio above and below the normal riding position.

8. Spring suspension for auto vehicles, comprising a leaf spring, a spring supporting member, shackle supports, pairs of shackle members pivoted to said shackle supports and to the opposite ends of said leaf spring respectively, and an oscillatable control member secured to said spring supporting member and having its opposite ends pivoted to one shackle member of each pair, the relationship of said control member to said spring and shackles being such that the spring supporting shackle member of each pair is moved in the direction of the movement of the spring supporting member for the normal riding movements of the spring, said control member resisting movement of the shackles and opposing movement of the spring incident to the movement of the spring above and below the normal riding position and moving the spring supporting shackle members in the opposite direction to the movement of the spring supporting member at the extreme movement thereof.

WILLIAM H. COLLIER.